United States Patent
Yoshii et al.

(10) Patent No.: US 8,355,644 B2
(45) Date of Patent: Jan. 15, 2013

(54) TONER-REMAINING-AMOUNT DETECTION SENSOR AND TONER STORAGE CONTAINER PROVIDED THEREWITH

(75) Inventors: Tatsuhiko Yoshii, Osaka (JP); Naoki Yamane, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 170 days.

(21) Appl. No.: 13/034,127

(22) Filed: Feb. 24, 2011

(65) Prior Publication Data
US 2011/0229155 A1 Sep. 22, 2011

(30) Foreign Application Priority Data
Mar. 17, 2010 (JP) ................................. 2010-061023

(51) Int. Cl.
*G03G 15/08* (2006.01)
*B05C 11/00* (2006.01)
*G08B 21/00* (2006.01)
(52) U.S. Cl. ........................... 399/61; 118/692; 340/617
(58) Field of Classification Search .................... 399/27, 399/30, 61, 62, 64; 118/688, 692, 694; 340/612, 340/614, 617, 626; 73/299, 301
See application file for complete search history.

(56) References Cited

U.S. PATENT DOCUMENTS

| | | | | |
|---|---|---|---|---|
| 4,174,902 A | * | 11/1979 | Hamaguchi | ...................... 399/27 |
| 4,761,674 A | * | 8/1988 | Ogura | .............................. 399/35 |
| 5,557,368 A | * | 9/1996 | Endo et al. | ....................... 399/27 |
| 6,044,717 A | * | 4/2000 | Biegelsen et al. | ......... 73/862.583 |
| 6,337,956 B1 | | 1/2002 | Sato et al. | |
| 7,555,230 B2 | | 6/2009 | Mukataka et al. | |

FOREIGN PATENT DOCUMENTS

| | | | |
|---|---|---|---|
| JP | 59202472 A | * | 11/1984 |
| JP | 1-23148 | | 7/1989 |
| JP | 06289714 A | * | 10/1994 |
| JP | 2782205 | | 5/1998 |
| JP | 2000-250301 | | 9/2000 |
| JP | 2006-284747 | | 10/2006 |
| JP | 2008-102478 | | 5/2008 |

* cited by examiner

*Primary Examiner* — Robert Beatty
(74) *Attorney, Agent, or Firm* — Smith, Gambrell & Russell, LLP (57) ABSTRACT

A toner-remaining-amount detection sensor includes a rubber member, an actuator, a transmission sensor, and a holder member which integrally holds the rubber member, the actuator, and the transmission sensor. The actuator is supported by the holder member so as to move to a first position at which the transmission sensor detects that a toner remaining amount in a toner storage container is a predetermined amount or more when a toner pressure in the toner storage container acts on the rubber member, and to move to a second position at which the transmission sensor detects that the toner remaining amount in the toner storage container falls below the predetermined amount when the toner pressure in the toner storage container does not act on the rubber member. When the actuator is at the second position, the actuator partially comes into contact with the holder member so that a gap is formed between the actuator and the rubber member.

8 Claims, 6 Drawing Sheets

TONER-REMAINING-AMOUNT DETECTION SENSOR AND TONER STORAGE CONTAINER PROVIDED THEREWITH

This application is based upon and claims the benefit of priority from the corresponding Japanese Patent Application No. 2010-61023 filed on Mar. 17, 2010, the entire contents of which are incorporated herein by reference.

BACKGROUND OF THE INVENTION

1. Field of the Invention

The present invention relates to a toner storage container such as a developing device and an intermediate hopper which are provided to an electrophotographic image forming apparatus such as a copier, a printer, a facsimile, and a multifunction peripheral having functions of those devices. In particular, the present invention relates to a toner-remaining-amount detection sensor for detecting a toner remaining amount in the toner storage container.

2. Description of Related Art

Conventionally, the electrophotographic image forming apparatus such as a copier and a laser printer is provided with a toner replenishing device such as a toner container for replenishing toner from a toner replenishing port to a developing portion (developing device) of the image forming apparatus. In order to stably replenish toner from the toner replenishing device to the developing device, it is important to accurately detect the toner remaining amount in the toner replenishing device. Examples of sensors used for detection of the toner remaining amount include a piezoelectric sensor, a magnetic permeability sensor, and an optical sensor.

The piezoelectric sensor is designed to take out a detection result of application of pressure to a detection surface as an electric signal, and has features of small size, lightweight, and high sensitivity. Further, in order to maintain detection accuracy, a sensor surface is required to be sufficiently cleaned. For example, as disclosed in the first and second related arts, there has been known a technology of cleaning the sensor surface of the piezoelectric sensor through use of a cleaning member.

The magnetic permeability sensor is designed to detect magnetic permeability of developer and output a voltage value corresponding to the detection result. Regarding use for detection of the toner remaining amount in the toner replenishing device, the magnetic permeability sensor is capable of detecting a magnetic one-component toner. However, the magnetic permeability sensor is incapable of detecting a non-magnetic one-component toner or a non-magnetic toner added to a two-component developer.

The optical sensor includes a reflection optical sensor and a transmission optical sensor. For example, as disclosed in the third related art, there has been known a color image forming apparatus capable of detecting a toner remaining amount of each color through use of one toner-remaining-amount detection sensor by converting light from a light emitting portion of the reflection optical sensor into different light for each of a plurality of developing devices and imparting the light to a light receiving portion. Further, as disclosed in the fourth related art, there has been known a method of enhancing detection accuracy by provision of a cleaning member for preventing adhesion of toner to a detection window of the transmission optical sensor.

Still further, as disclosed in the fifth related art, there has been known a collected-toner-amount detection sensor including a detecting filler rotated in accordance with collection of toner, a detection sensor (photo interrupter) in which a light path is blocked or unblocked in accordance with rotation of the detecting filler, and a rubber sheet for preventing toner leakage into an operating space of the detecting filler.

However, the piezoelectric sensor is expensive, and provision of the cleaning mechanism for the sensor surface as in the first and second related arts causes structural complication of the toner replenishing device, which leads to an increase in cost.

Further, in the reflection optical sensor as disclosed in the third and fourth related arts, an inclination of a reflection plate with respect to a light source (light emitting portion) is important, and hence a light emitting direction and an attachment position of the reflection plate are required to have high accuracy. Also in the transmission optical sensor, when a light-emitting-side sensor and a light-receiving-side sensor are separately provided, positional relation of the sensors is important. Accordingly, there are risks that assembly operation becomes more troublesome and complicated and operability is deteriorated, and that sensor sensitivities vary from each other owing to tolerances of components. In addition, as disclosed in the fourth related art, provision of the cleaning mechanism for the detection window leads to deterioration of assembly operability and an increase in cost due to an increase in the number of components.

Meanwhile, in the structure of the fifth related art, the toner remaining amount is detected with toner pressure, and hence it is unnecessary to perform cleaning of the detection surface. However, the rubber sheet and the detecting filler are arranged on a cleaning case (toner collecting container) side, and the detection sensor is arranged on an apparatus main body side. Thus, some attachment states of the cleaning case cause a change of positional relation between the detecting filler and the detection sensor, which leads to a risk that the sensor sensitivities vary from each other. Further, also when the structure of the fifth related art is applied to a toner storage container undetachable from the apparatus main body, attachment positions of the detecting filler and the detection sensor are required to have high accuracy. Thus, there are problems in that assembly operation becomes more troublesome and complicated, and operability is deteriorated.

Further, the rubber sheet described in the fifth related art is triangular in cross-section and asymmetrical. Thus, a deformation degree of the rubber sheet varies depending on directions in which toner pressure is applied, which may lead to a risk of deterioration of sensor sensitivity. High detection accuracy is not required for the purpose of detecting a full state of the cleaning case (toner collecting container). Meanwhile, the toner remaining amount in the developing device and the toner remaining amount in the intermediate hopper for replenishing toner have influence on image quality, and hence it is necessary to detect those toner remaining amounts with high accuracy. In addition, when an easily-deformable thin-film-like rubber sheet is used for higher detection accuracy, there is a risk that the detecting filler presses and breaks the rubber sheet.

Note that, regarding those cases, although description is made by way of an example of detection of the toner remaining amount of the toner replenishing device for replenishing toner to the developing device, there are similar problems in detection of a remaining amount of toner or developer in the developing device.

SUMMARY OF THE INVENTION

It is an object of the present invention to provide a toner-remaining-amount detection sensor and a toner storage container provided therewith, the toner-remaining-amount detection sensor being capable of detecting a toner remaining amount with high accuracy irrespective of types of toner, being free from a cleaning mechanism for a sensor surface or a detection window, and being excellent in assembly property and durability.

A toner-remaining-amount detection sensor according to an aspect of the present invention includes: a rubber member which is formed of a thin film, arranged so as to face an inside of a toner storage container for storing toner, and elastically deformed in accordance with a change of toner pressure in the toner storage container; an actuator which is arranged on an outside of the toner storage container while sandwiching the rubber member between the toner storage container and the actuator and which reciprocates in accordance with elastic deformation of the rubber member; a transmission sensor which includes a light detecting portion including a light emitting portion and a light receiving portion and which is arranged so that a light path of the light detecting portion is blocked or unblocked by reciprocation of the actuator; and a holder member which integrally holds the rubber member, the actuator, and the transmission sensor, in which: the actuator is supported by the holder member so as to move to a first position at which the transmission sensor detects that a toner remaining amount in the toner storage container is a predetermined amount or more when the toner pressure in the toner storage container acts on the rubber member, and to move to a second position at which the transmission sensor detects that the toner remaining amount in the toner storage container falls below the predetermined amount when the toner pressure in the toner storage container does not act on the rubber member; and when the actuator is at the second position, the actuator partially comes into contact with the holder member so that a gap is formed between the actuator and the rubber member.

Further features and advantages of the present invention will become apparent from the description of embodiments given below.

DETAILED DESCRIPTION OF PREFERRED EMBODIMENT

Figure 1:
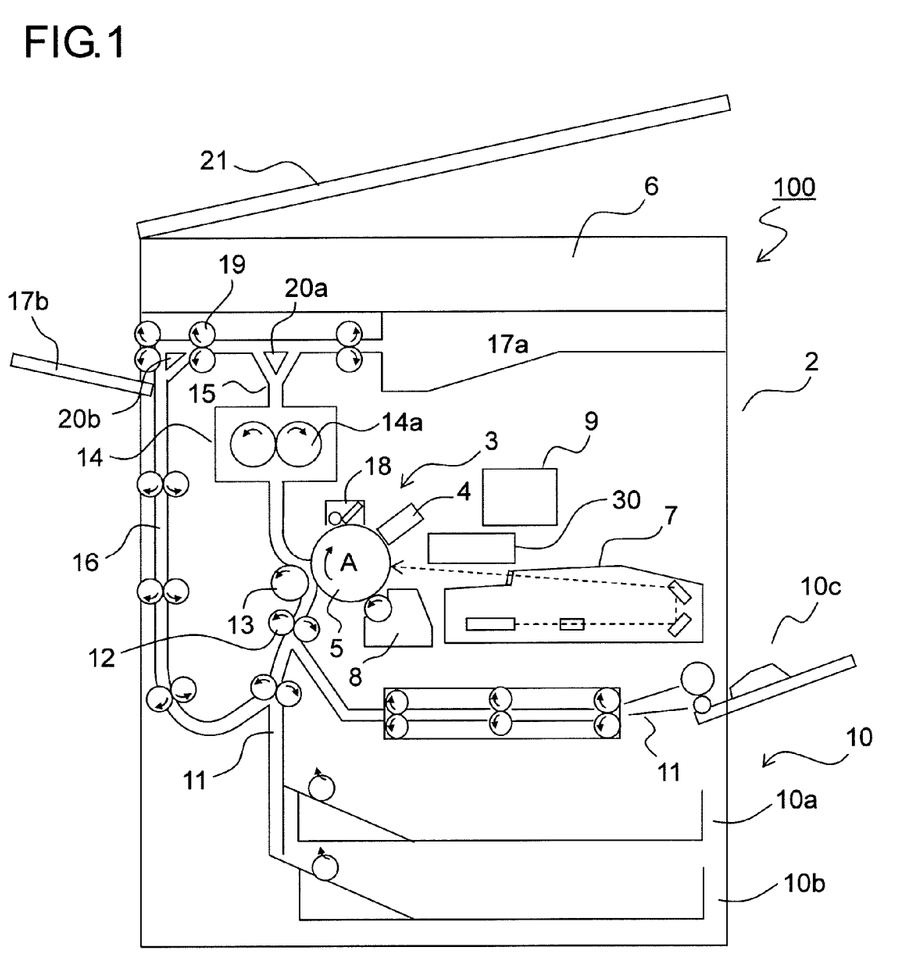
FIG. 1 is a schematic structural view of an image forming apparatus provided with an intermediate hopper according to an embodiment of the present invention.

In the following, description is made of an embodiment of the present invention with reference to the drawings. FIG. 1 is a schematic view of an internal structure of an image forming apparatus provided with a toner replenishing device according to the embodiment of the present invention. In an image forming apparatus 100 (digital multifunction peripheral in this case), at a time of copying operation, in an image forming portion 3 in a multifunction peripheral main body 2, a charging unit 4 uniformly charges a photosensitive drum 5 rotated in a direction A in FIG. 1. Next, a laser beam emitted from an exposure device (laser scanning unit or the like) 7, which is based on image data of an original document read in an image reading portion 6, forms an electrostatic latent image on the photosensitive drum 5. Then, a developing device 8 causes toner to adhere to the electrostatic latent image so as to form a toner image. The toner is supplied from a toner container 9 to the developing device 8 through intermediation of an intermediate hopper 30.

To the photosensitive drum 5 having the toner image formed thereon as just described above, sheets are conveyed at a predetermined timing from a sheet feeding mechanism 10 to the image forming portion 3 by way of a sheet conveyance path 11 and a registration roller pair 12. Next, in the image forming portion 3, a transfer roller 13 transfers the toner image on a surface of the photosensitive drum 5 to each of the sheets. Then, each of the sheets having the toner images transferred thereon is separated from the photosensitive drum 5 and conveyed into a fixing portion 14 including a fixing roller pair 14a, and the toner images are fixed. The sheets passing the fixing portion 14 are sent into a sheet conveyance path 15 branched in a plurality of directions, and then are routed into different conveying directions by a plurality of path switching mechanisms 20a and 20b which are provided at branch points on the sheet conveyance path 15 and include path switching guides. The sheets thus routed are delivered as they are (or after being sent into a sheet conveyance path 16 so as to undergo double-face copying) onto a sheet delivery portion constituted by a first delivery tray 17a and a second delivery tray 17b.

Further, although not shown, a destaticizing device for removing residual charge on the surface of the photosensitive drum 5 is provided between a cleaning device 18 and the charging unit 4. Further, the sheet feeding mechanism 10 includes a plurality of sheet feeding cassettes 10a and 10b which are detachable with respect to the multifunction peripheral main body 2 for receiving the sheets, and a manual sheet feeding mechanism (bypass unit) 10c provided thereabove. Through intermediation of the sheet conveyance path 11, the cassettes and mechanism communicate to the image forming portion 3 constituted by the photosensitive drum 5, the developing device 8, and the like. At an upper end of the image reading portion 6, there is provided an openable/closable platen (original document presser) 21 capable of pressing and holding an original document placed on a contact glass.

Specifically, the sheet conveyance path 15 is first branched left and right on a downstream side of the fixing roller pair 14a, and one branch path (path directed right in FIG. 1) communicates to the first delivery tray 17a. Meanwhile, another branch path (path directed left in FIG. 1) is branched up and down by way of a conveyance roller pair 19, and derivative one branch path (path directed left in FIG. 1) communicates to the second delivery tray 17b. In contrast, derivative another branch path (path directed down in FIG. 1) communicates to the sheet conveyance path 16.

Figure 2:
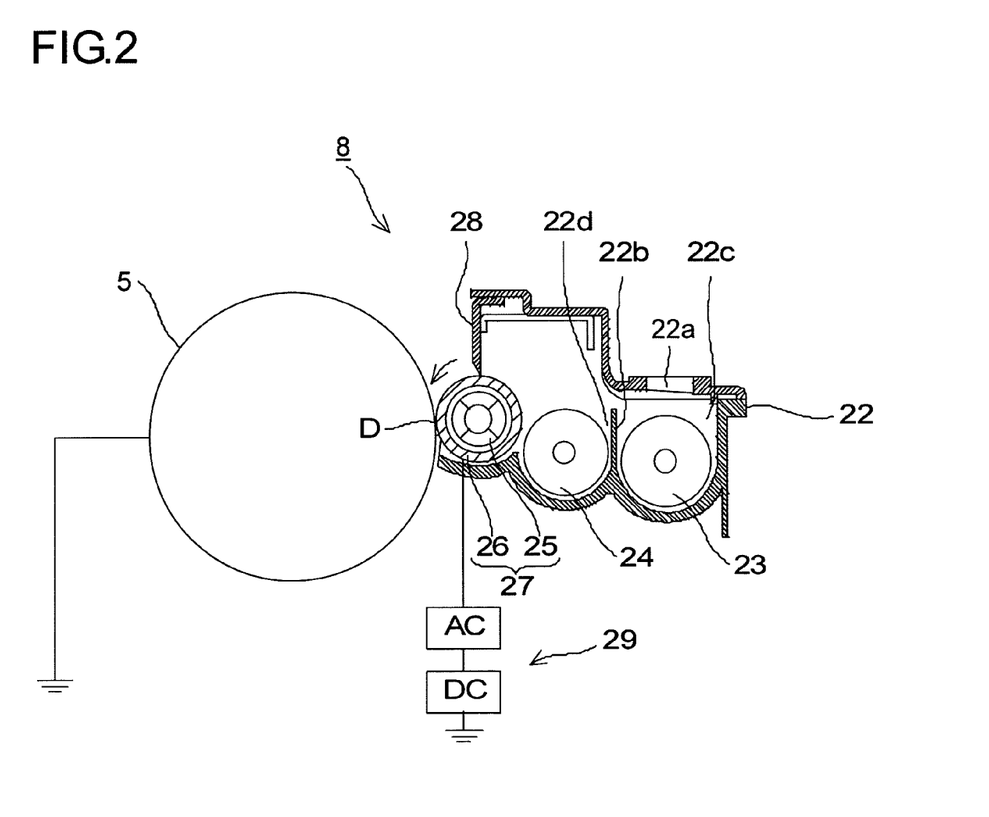
FIG. 2 is a sectional side view illustrating a schematic structure of a developing device in which toner is replenished from the intermediate hopper according to the embodiment of the present invention.

Next, description is made of the developing device with reference to FIG. 2. FIG. 2 is a sectional side view illustrating a schematic structure of the developing device used for the image forming apparatus 100. The developing device 8 includes a developing container 22 in which a one-component magnetic toner is stored, stirring screws 23 and 24 for stirring the toner, a developing roller 27, and a regulating member 28.

A toner replenishing port 22a is provided in an upper portion of the developing container 22. When the toner in the developing container 22 is consumed and reduced, new toner is replenished from the intermediate hopper 30 (refer to FIG. 1) into the developing container 22 through the toner replenishing port 22a.

The developing container 22 is partitioned by a partition wall 22b into a first stirring chamber 22c and a second stirring chamber 22d. Stirring screws 23 and 24 are rotatably arranged in the first and second stirring chambers 22c and 22d, respectively. Developer passages (not shown) are formed at both end portions in a longitudinal direction of the partition wall 22b (directions to the front side and the back side of the drawing sheet). The toner in the developing container 22 is stirred and circulated by the stirring screws 23 and 24, and then supplied to the developing roller 27.

The developing roller 27 includes a fixed magnet body 25 and a developing sleeve 26. The developing sleeve 26 is formed of a cylindrical non-magnetic member, and rotatably supported at a position adjacent to the stirring screw 24 by the developing container 22. The fixed magnet body 25 is constituted by a permanent magnet fixedly provided in the developing sleeve 26, and generates a magnetic field to the developing sleeve 26. Further, the developing roller 27 is exposed from an opening of the developing container 22, and faces the photosensitive drum 5 which serves an image carrier at a fixed interval. The facing region constitutes a developing region D for supplying toner carried on the developing sleeve 26 to the photosensitive drum 5. In addition, a developing bias power source 29 for applying a developing bias obtained by superimposition of an alternating voltage onto a direct voltage is connected to the developing sleeve 26.

The regulating member 28 is provided for regulating the toner carried on a surface of the developing sleeve 26 to have a predetermined layer thickness, and is fixed to the developing container 22 substantially above the developing sleeve 26 (upstream side of the developing region D in a rotational direction of the developing sleeve 26) at a predetermined interval with respect to the surface of the developing sleeve 26.

A magnetic force of the fixed magnet body 25 in the developing sleeve 26 causes toner supplied from the stirring screw 24 to be carried on the surface of the developing sleeve 26. The toner thus carried is regulated by the regulating member 28 so as to have a predetermined layer thickness, and conveyed to the developing region D by rotation of the developing sleeve 26 (rotation in an allow direction of FIG. 2). A developing bias is applied from the developing bias power source 29 to the developing sleeve 26, which generates potential difference between the developing sleeve 26 and the photosensitive drum 5 in the developing region D. As a result, the toner on the developing sleeve 26 is supplied to the photosensitive drum 5, and an electrostatic latent image on the photosensitive drum 5 is developed into a toner image.

Figure 3:
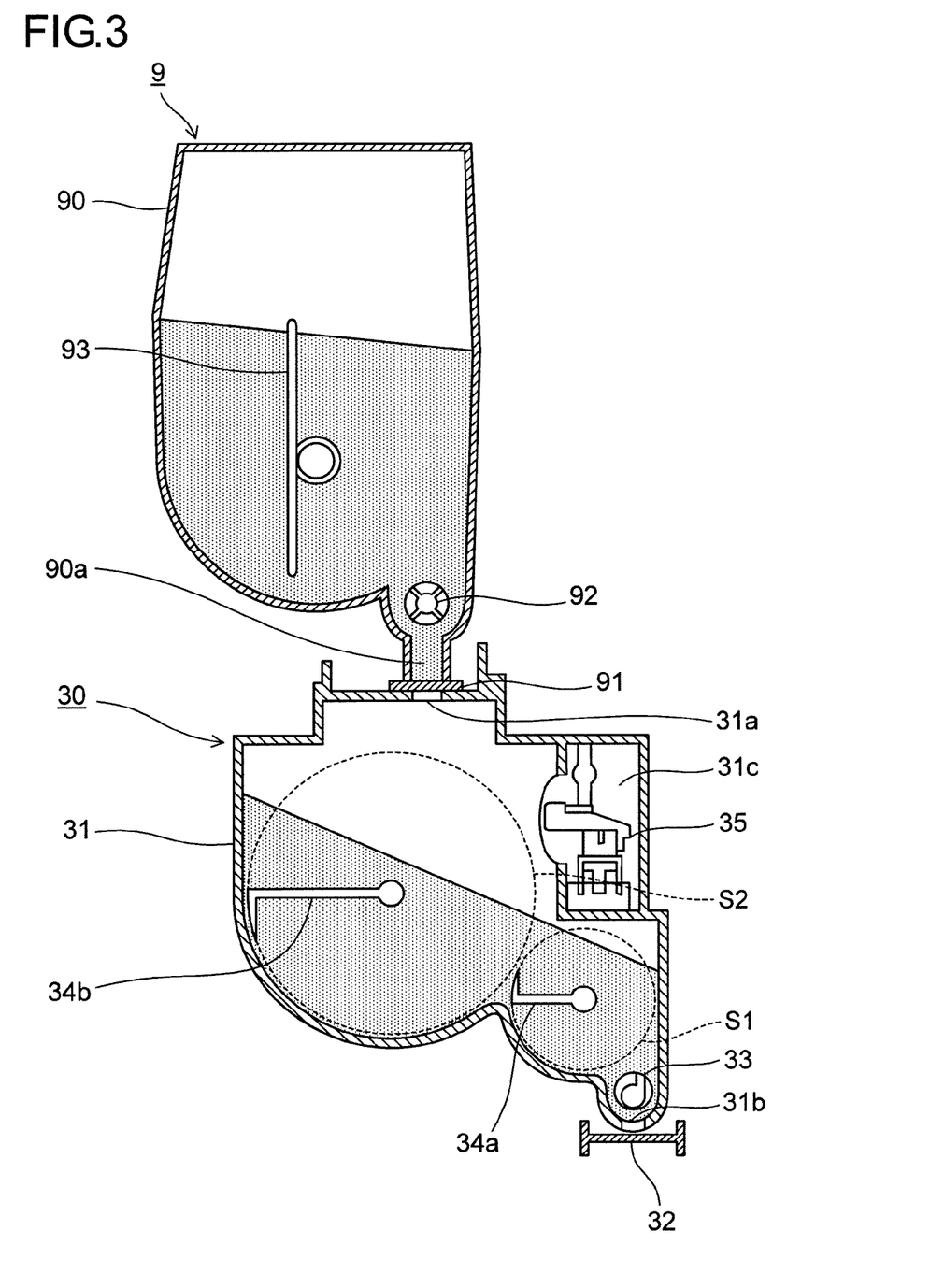
FIG. 3 is a sectional side view of a toner container and the intermediate hopper according to the embodiment of the present invention.

Next, description is made of the intermediate hopper with reference to FIG. 3. FIG. 3 is a sectional side view illustrating schematic structures of the toner container and the intermediate hopper for replenishing toner to the developing device 8.

The toner container 9 includes a container vessel 90 which is provided with a replenishing port 90a for supplying toner to the intermediate hopper 30 and which stores unused toner, a shutter member 91 for switching an open/close state of the replenishing port 90a, a container screw 92, and a stirring paddle 93. Further, the toner container 9 is detachably mounted to the intermediate hopper 30.

The container screw 92 is provided with helical blades formed at a predetermined pitch on an outer peripheral surface of a rotary shaft. The container screw 92 is arranged along a bottom portion in the container vessel 90, and faces the replenishing port 90a provided at one end portion in an axial direction. When the container screw 92 is rotated about the rotary shaft, toner is stirred and conveyed to the replenishing port 90a. Next, when the shutter member 91 closing the replenishing port 90a opens the replenishing port 90a, the toner in the container vessel 90 is supplied to the intermediate hopper 30 through the replenishing port 90a.

The stirring paddle 93 is constituted by a rotary shaft and a paddle-like stirring blade extending from the rotary shaft to both sides in a radial direction and having a predetermined width in an axial direction. Rotation of the stirring blade causes the toner in the container vessel 90 to be stirred.

When the toner is supplied from the toner container 9 to the intermediate hopper 30 and the toner in the container vessel 90 is used up, the toner container 9 is detached from the intermediate hopper 30, and a new toner container 9 is attached to the intermediate hopper 30.

The intermediate hopper 30 includes a hopper container 31 for storing toner, and the hopper container 31 is provided with an intake port 31a for taking in the toner supplied from the toner container 9 and a send-out port 31b for sending out the toner in the hopper container 31 to the developing device 8. Further, the intermediate hopper 30 includes a shutter member 32 for switching an open/close state of the send-out port 31b, a conveying member 33, first and second stirring members 34a and 34b, and a toner-remaining-amount detection sensor 35.

The intake port 31a is formed in an upper portion of the hopper container 31 at a position of facing the replenishing port 90a of the toner container 9. The send-out port 31b is formed in a bottom portion of the hopper container 31 at one end portion in the axial direction, and faces the toner replenishing port 22a (refer to FIG. 2) of the developing device 8.

The conveying member 33 is provided with helical blades at a predetermined pitch on an outer peripheral surface of a rotary shaft. The conveying member 33 is arranged along the bottom portion in the hopper container 31, and faces the send-out port 31b provided at one end in the axial direction. When the conveying member 33 is rotated about the rotary shaft, toner is stirred and conveyed to the send-out port 31b.

Each of the first and second stirring members 34a and 34b is constituted by a rotary shaft rotatably supported in the hopper container 31 and a stirring blade extending from the rotary shaft in the radial direction and having a predetermined width in the axial direction. The stirring blade of each of the first and second stirring members 34a and 34b has a distal end portion bent in a rotational direction.

The second stirring member 34b is provided substantially below the intake port 31a in the hopper container 31, and hence toner drops from the intake port 31a to the second stirring member 34b. The second stirring member 34b is rotated counterclockwise in FIG. 3 so as to stir the toner in the hopper container 31.

An outer diameter of the stirring blade of the second stirring member 34b is larger than that of the first stirring member 34a. Thus, an area S2 in a direction orthogonal to the rotary shaft in a region which the stirring blade passes at a time of rotation of the second stirring member 34b (range within a broken line of FIG. 3) is relatively large, and hence a large amount of toner in the hopper container 31 is stirred. Then, the second stirring member 34b conveys the stirred toner to the first stirring member 34a side.

The first stirring member 34a is arranged on a lower right side with respect to the second stirring member 34b while facing the second stirring member 34b, and at the same time, substantially above the conveying member 33 while facing the conveying member 33. The first stirring member 34a is rotated clockwise in FIG. 3 so as to stir the toner conveyed from the second stirring member 34b.

The outer diameter of the stirring blade of the first stirring member 34a is smaller than that of the second stirring member 34b. Thus, an area S1 in a direction orthogonal to the rotary shaft in a region which a blade part passes at a time of rotation of the first stirring member 34a (range within a broken line of FIG. 3) is smaller than the area S2. Specifically, toner by an amount of one replenishment to a developing device 8 is stirred. Then, the first stirring member 34a conveys the stirred toner to a conveying member 33 side. The area S1 in the region which the stirring blade passes at the time of the rotation of the first stirring member 34a is ⅓ to ⅕ of the area S2 in the region which the blade part passes at the time of the rotation of the second stirring member 34b.

The toner-remaining-amount detection sensor 35 is provided for detecting a toner amount in the hopper container 31. In accordance with detection results, toner is supplied from the toner container 9 to the intermediate hopper 30. The toner-remaining-amount detection sensor 35 is accommodated in a sensor chamber 31c. The sensor chamber 31c is formed in a space above the first stirring member 34a and on the right of the second stirring member 34b in the hopper container 31, and arranged without protruding form the hopper container 31. Note that, description of specific structure of the toner-remaining-amount detection sensor 35 is made later.

The conveying member 33 and the first and second stirring members 34a and 34b are rotationally driven by a drive source (not shown) such as a motor. When the drive source is rotated, the first stirring member 34a and the conveying member 33 are in conjunction with each other so as to be rotated at the same number of rotations per unit time. Note that, the conveying member 33 may be driven in conjunction with the first stirring member 34a so as to be rotated at a higher number of rotations per unit time than that of the first stirring member 34a.

Meanwhile, the first stirring member 34a and the second stirring member 34b mesh with a decelerating gear train (not shown) provided therebetween. When the second stirring member 34b is rotated at a predetermined number of rotations per unit time, the first stirring member 34a is rotated at a higher number of rotations per unit time than that of the second stirring member 34b. The first stirring member 34a is rotated at a number of rotations per unit time 3 to 5 times higher than a number of rotations per unit time of the second stirring member 34b.

Accordingly, the second stirring member 34b is rotated at lower speed than the first stirring member 34a by a drive force from the drive source, and the large amount of toner in the hopper container 31 is gently stirred. Meanwhile, the first stirring member 34a is rotated at higher speed than the second stirring member 34b, and toner by an amount required for replenishment to the developing device 8 is rapidly stirred. The toner stirred by the first stirring member 34a is conveyed to the conveying member 33 side.

Then, rotation of the conveying member 33 causes the stirred toner to be conveyed to the send-out port 31b. Next, when the shutter member 32 closing the send-out port 31b opens the send-out port 31b, the toner in the hopper container 31 is replenished from the toner replenishing port 22a (refer to FIG. 2) to the developing device 8 through the send-out port 31b.

Figure 4:
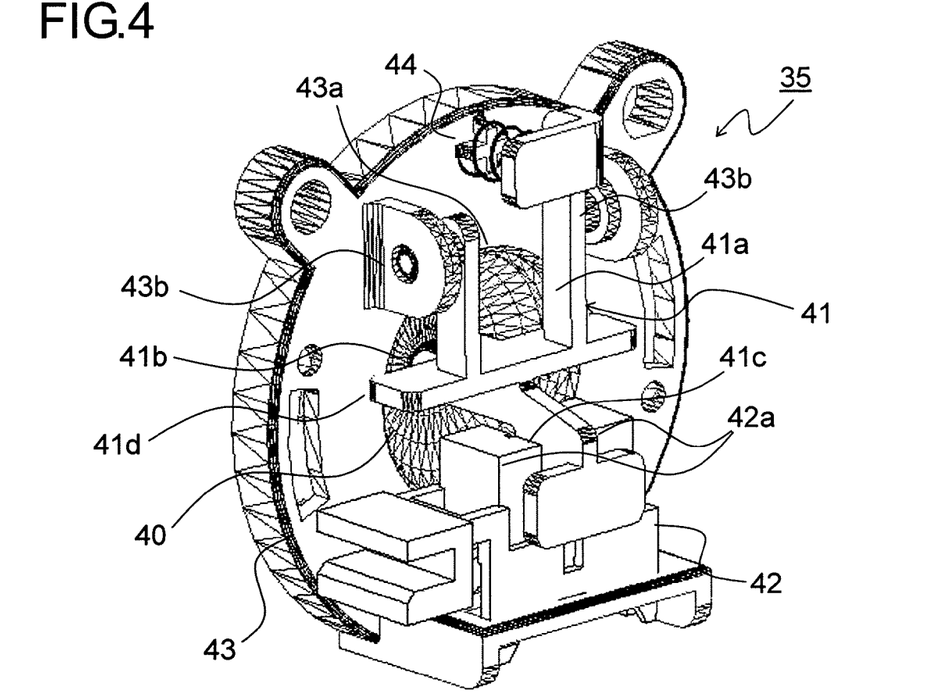
FIG. 4 is a perspective view of a toner-remaining-amount detection sensor according to the embodiment of the present invention, when viewed from a sensor chamber side.
Figure 5:
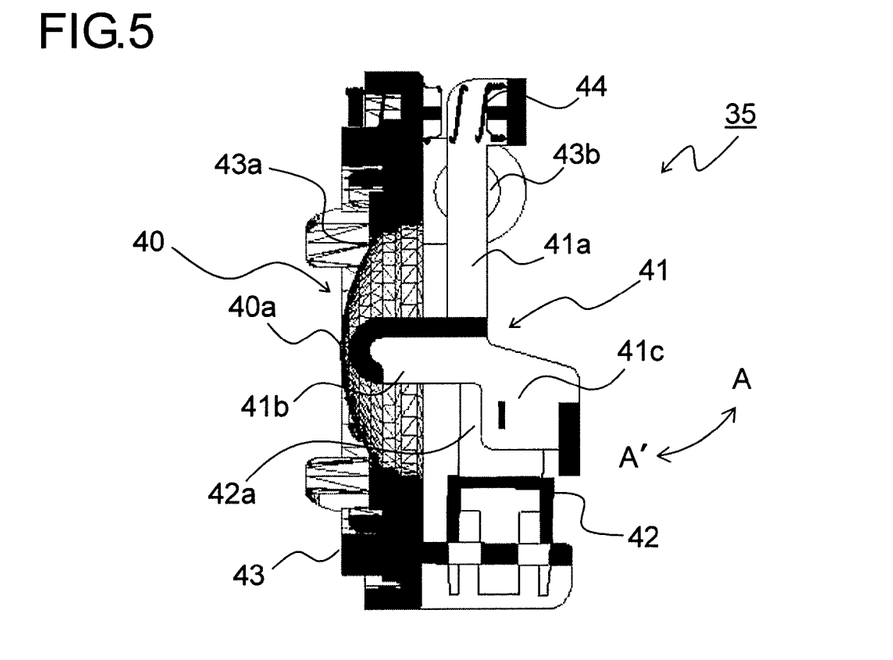
FIG. 5 is a sectional side view of the toner-remaining-amount detection sensor according to the embodiment of the present invention.

FIG. 4 is a perspective view of the toner-remaining-amount detection sensor 35 of FIG. 3 when viewed from the sensor chamber 31c side, and FIG. 5 is a sectional side view of the toner-remaining-amount detection sensor 35. The toner-remaining-amount detection sensor 35 is constituted by a rubber member 40 partitioning between the hopper container 31 and the sensor chamber 31c, an actuator 41 arranged on the sensor chamber 31c side of the rubber member 40, a transmission sensor 42 arranged below the actuator 41, and a holder member 43 to which the rubber member 40, the actuator 41, and the transmission sensor 42 are mounted.

The rubber member 40 is fixed so as to form, in a circular opening 43a formed in a central portion of the holder member 43, a convex onto an inside of the hopper container 31 (left side of FIG. 5). The rubber member 40 prevents entry of toner into the sensor chamber 31c, and is elastically deformed by a pressure of toner (hereinafter, referred to as toner pressure) in the hopper container 31 so as to press the actuator 41.

Figure 6:
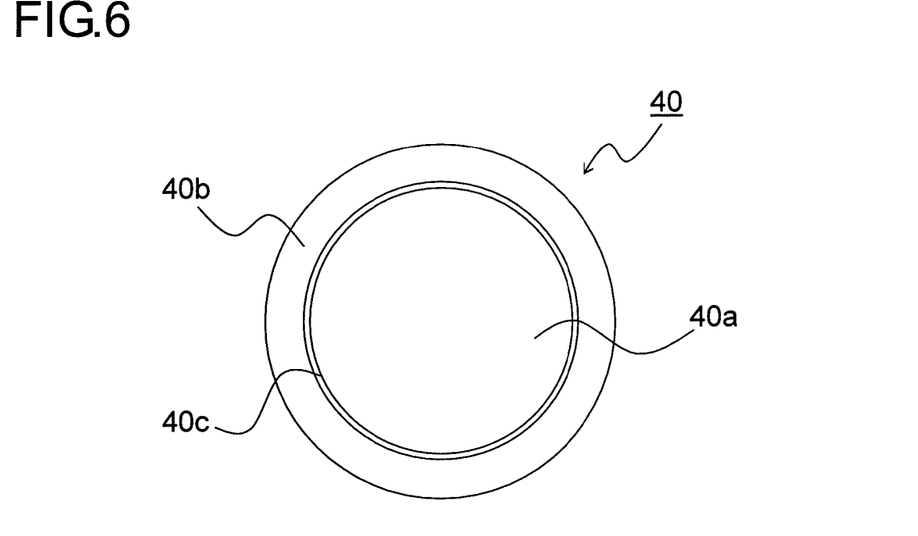
FIG. 6 is a plan view of a rubber member used for the toner-remaining-amount detection sensor according to the embodiment of the present invention, when viewed from a protruding surface side.
Figure 7:
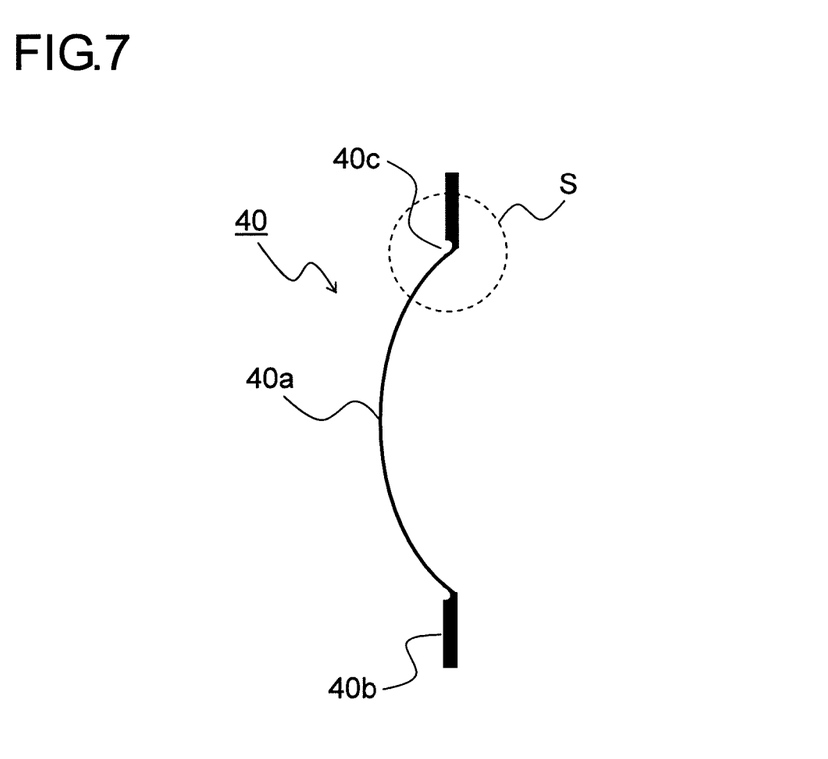
FIG. 7 is a sectional side view of the rubber member used for the toner-remaining-amount detection sensor according to the embodiment of the present invention.
Figure 8:
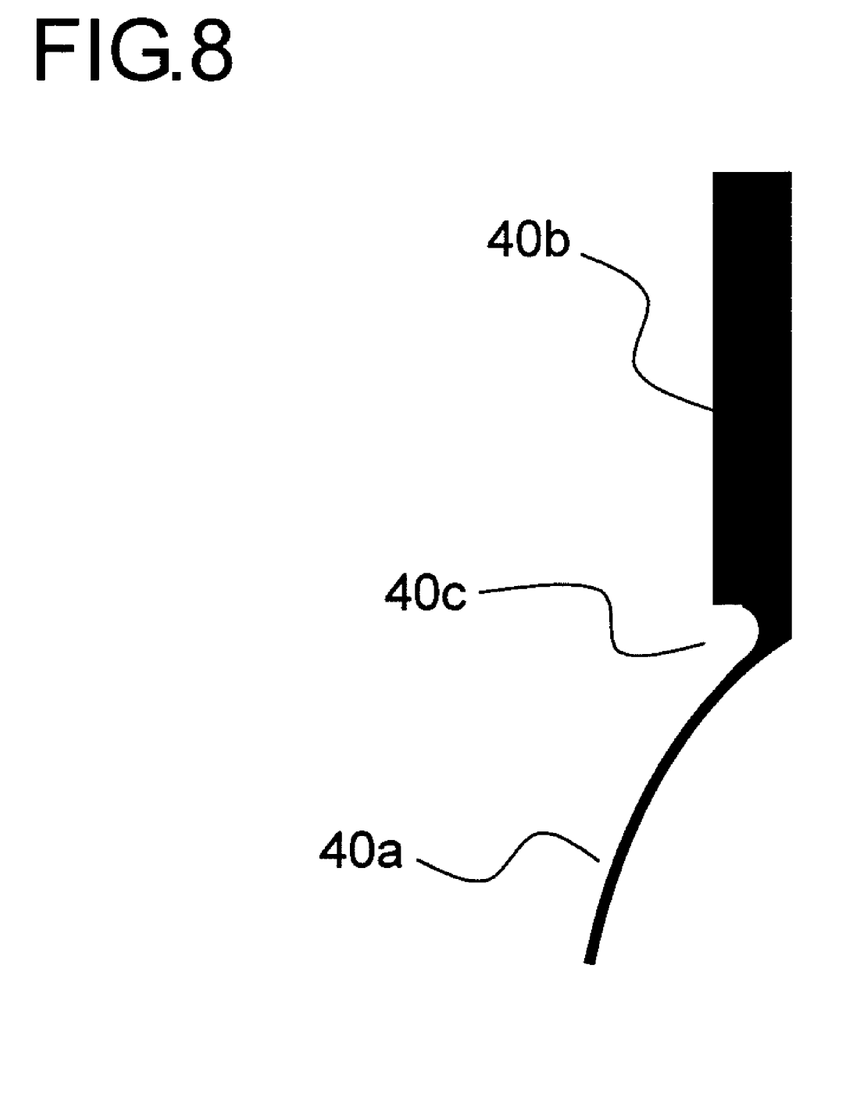
FIG. 8 is a partially enlarged view illustrating an inside of a broken-line circle S of FIG. 7 according to the embodiment of the present invention.

FIG. 6 is a plan view of the rubber member 40 when viewed from the convex side, FIG. 7 is a sectional side view of the rubber member 40, and FIG. 8 is a partially enlarged view of an inside of the broken-line circle S of FIG. 7. As illustrated in FIGS. 6 to 8, the rubber member 40 is constituted by a spherical toner detecting portion 40a and a flange-like holder attachment portion 40b formed integrally with the toner detecting portion 40a therearound. Further, on the convex side of the rubber member 40 facing the hopper container 31, there is formed an annular step 40c on a boundary between the toner detecting portion 40a and the holder attachment portion 40b.

The toner detecting portion 40a is formed of a thin film so as to be easily deformed even by low toner pressure, and formed in a spherical shape so that degree of deformation does not vary depending on a toner-pressure-application direction. The holder attachment portion 40b is formed to be thicker than the toner detecting portion 40a so as to be firmly and stably fixed to the holder member 43. An appropriate thickness of the toner detecting portion 40a falls within a range of approximately 0.1 to 0.2 mm, and an appropriate thickness of the holder attachment portion 40b falls within a range of approximately 0.5 to 2 mm. Further, the step 40c formed on the boundary between the toner detecting portion 40a and the holder attachment portion 40b prevents an increase in thickness of a peripheral portion of the toner detecting portion 40a. Accordingly, the toner detecting portion 40a may be easily reversed by the toner pressure, and detection sensitivity to the toner pressure is increased.

The actuator 41 includes an arm portion 41a rockably supported by a fulcrum 43b of the holder member 43, a pressure detecting portion 41b which approaches the toner detecting portion 40a of the rubber member 40 from a concave side, a light blocking plate 41c for switching ON/OFF of the transmission sensor 42, and a rib 41d protruding in a horizontal direction from the arm portion 41a. Further, at an upper end portion of the arm portion 41a, there is arranged a spring member 44 for urging the actuator 41 in an arrow A' direction. As the spring member 44, a plate spring, a twist-coil spring, and the like may be substituted for the coil spring illustrated in the figures. It is necessary that an urging force of the spring member 44 be set to be weak enough to allow the actuator 41 to be moved to a first position (described later) by the toner pressure. With the urging force of the spring member 44 being set as described above, the actuator 41 does not excessively push the toner detecting portion 40a of the rubber member 40, thereby being capable of preventing the toner detecting portion 40a from being damaged.

The transmission sensor 42 is a photo-interrupter (PI) sensor having C-shaped opposing inner surfaces in plan view on which a light detecting portion 42a constituted by a light emitting portion and a light receiving portion is provided. When the light blocking plate 41c of the actuator 41 passes the light detecting portion 42a and blocks or unblocks a light path, a light-receiving signal level of the light detecting portion 42a is switched into LOW or HIGH. In this manner, the transmission sensor 42 is capable of detecting the toner pressure in the hopper container 31, that is, a toner remaining amount.

Next, description is made of operation of the toner-remaining-amount detection sensor 35 with reference to FIGS. 4 and 5. When the toner in the hopper container 31 is consumed and a toner level is below the rubber member 40, the toner pressure is not applied to the rubber member 40 (toner detecting portion 40a). Thus, as illustrated in FIG. 5, the actuator 41 remains stationary with the arm portion 41a being directed perpendicularly downward by the urging force of the spring member 44. In this state, the light blocking plate 41c is arranged in the light detecting portion 42a so that the light path from the light emitting portion to the light receiving portion is blocked. As a result, the light-receiving signal level becomes LOW (sensor OFF state).

When the toner is replenished from the toner container 9 into the hopper container 31, the toner detecting portion 40a of the rubber member 40 is elastically deformed by the toner pressure, and reversed so as to be convexed on the sensor chamber 31c side. As a result, the pressure detecting portion 41b of the actuator 41 arranged near the toner detecting portion 40a is pressed, and the actuator 41 rocks in the arrow A direction about the fulcrum 43b against the urging force of the spring member 44.

In accordance with the rocking of the actuator 41, the light blocking plate 41c having blocked the light to the light detecting portion 42a of the transmission sensor 42 moves upward and unblocks the light path (first position). At this time, the light-receiving signal level of the transmission sensor 42 is switched from LOW to HIGH (sensor ON state). Then, a detection signal is sent from the transmission sensor 42 to a control portion (not shown), and the control portion determines that the intermediate hopper 30 is filled with toner by a predetermined amount or more.

When the toner in the hopper container 31 starts to be consumed again in this state, the actuator 41 rocks gradually in the arrow A' direction by the urging force of the spring member 44 in accordance with decrease in toner pressure. Then, when the toner level in the hopper container 31 falls below the toner detecting portion 40a, as illustrated in FIG. 5, the light blocking plate 41c blocks the light to the light detecting portion 42a (second position). At this time, the light-receiving signal level of the transmission sensor 42 is switched from HIGH to LOW (sensor OFF state). Then, a detection signal is sent from the transmission sensor 42 to the control portion (not shown), and the control portion determines that the toner remaining amount falls below a predetermined amount. Further, the toner detecting portion 40a is restored to the convex state on the hopper container 31 side by a restoring force.

After that, toner replenishing operation is performed from the toner container 9 to the intermediate hopper 30 in response to a control signal from the control portion. When the transmission sensor 42 is not switched into the ON state, the control portion determines that the toner container 9 is empty and urges replacement of the toner container 9.

With the above-mentioned structure, in comparison with conventional piezoelectric sensors, the toner remaining amount in the hopper container 31 may be accurately detected with a simple and inexpensive structure. Further, the toner remaining amount is detected through use of the toner pressure, and hence detection may be performed irrespective of types or colors of toner. In addition, detection accuracy is not influenced even when toner adheres to the toner detecting portion 40a, and hence it is unnecessary to provide a cleaning mechanism.

Further, the rubber member 40, the actuator 41, and the transmission sensor 42 are unitized by being integrally held by the holder member 43, and hence positional relations of the members mounted to the holder member 43 may be easily adjusted. Accordingly, operability at a time of assembly and maintenance of the toner-remaining-amount detection sensor 35 is enhanced. Further, the spring member 44 is provided for urging the actuator 41 in the arrow A' direction, and hence the actuator 41 reliably moves to the second position at a time of decrease in toner pressure so as to block the light path of the transmission sensor 42. Accordingly, that the actuator 41 does not move to the second position even when the toner remaining amount decreases, which prevents false detection that the toner remains.

When the actuator 41 moves to the second position by the urging force of the spring member 44, the rib 41d protruding from the arm portion 41a comes into contact with a peripheral portion of the opening 43a of the holder member 43, and hence the actuator 41 does not rock further in the arrow A' direction. In this case, a gap is formed between the toner detecting portion 40a of the rubber member 40 and the pressure detecting portion 41b of the actuator 41, and hence the toner detecting portion 40a and the pressure detecting portion 41b do not come into contact with each other. Accordingly, there is no risk that the pressure detecting portion 41b penetrates the toner detecting portion 40a formed of a thin film.

Note that, in this embodiment, although the actuator 41 moves to the second position by the urging force of the spring member 44 in accordance with decrease in toner pressure, the actuator 41 may return to the second position by its own weight. In this case, the urging force of the spring member 44 does not act as resistance when the actuator 41 moves to the first position. Thus, sensing is performed by lifting-up of the actuator 41 with the toner pressure, and the actuator 41 naturally returns to the original position when the toner pressure is eliminated. Accordingly, the detection sensitivity to the toner pressure is further increased.

Otherwise, the present invention is not limited to the above-mentioned embodiment, and various modifications may be made thereto without departing from the spirit of the present invention. For example, in the above-mentioned embodiment, description is made by way of an example in which the toner-remaining-amount detection sensor 35 is used for detection of the toner remaining amount in the intermediate hopper 30. Alternatively, the toner-remaining-amount detection sensor 35 may be used for detection of a toner remaining amount in the developing device 8.

Further, shapes of the actuator 41 and the holder member 43, arrangement of the transmission sensor 42, and the like are merely examples. Thus, those factors may be appropriately changed in accordance with specifications of the intermediate hopper 30 and the developing device 8 which are objects of the detection of the toner remaining amount. For example, in the above-mentioned embodiment, detection of the toner remaining amount more than a predetermined amount is obtained when the light blocking plate 41c unblocks the light path of the light detecting portion 42a (sensor ON state). Alternatively, the detection of the toner remaining amount more than a predetermined amount may be obtained when the light blocking plate 41c blocks the light path of the light detecting portion 42a (sensor OFF state).

The toner-remaining-amount detection sensor according to the embodiment of the present invention may be used for a developing device provided to an electrophotographic image forming apparatus such as a copier, a printer, a facsimile, and a multifunction peripheral having functions of those devices, and used for detection of a toner remaining amount in the intermediate hopper and the like for replenishment of toner to the developing device.

What is claimed is:

1. A toner-remaining-amount detection sensor, comprising:
    a rubber member which is formed of a thin film, arranged so as to face an inside of a toner storage container for storing toner, and elastically deformed in accordance with a change of toner pressure in the toner storage container;
    an actuator which is arranged on an outside of the toner storage container while sandwiching the rubber member between the toner storage container and the actuator and which reciprocates in accordance with elastic deformation of the rubber member;
    a transmission sensor which comprises a light detecting portion including a light emitting portion and a light receiving portion and which is arranged so that a light path of the light detecting portion is blocked or unblocked by reciprocation of the actuator; and
    a holder member which comprises
        an opening to which the rubber member is mounted and
        a fulcrum for rockably supporting the actuator and which integrally holds the rubber member, the actuator, and the transmission sensor, wherein:
    the actuator is supported by the holder member so as to move to a first position at which the transmission sensor detects that a toner remaining amount in the toner storage container is a predetermined amount or more when the toner pressure in the toner storage container acts on the rubber member, and to move to a second position at which the transmission sensor detects that the toner remaining amount in the toner storage container falls below the predetermined amount when the toner pressure in the toner storage container does not act on the rubber member; and
    when the actuator is at the second position, the actuator partially comes into contact with the holder member so that a gap is formed between the actuator and the rubber member.

2. A toner-remaining-amount detection sensor according to claim 1, wherein the rubber member comprises:
    a spherical and thin-film-like toner detecting portion forming a convex onto the inside of the toner storage container;
    a flange-like holder attachment portion fixed to an opening rim of the holder member and having a thickness larger than a thickness of the toner detecting portion; and
    an annular step formed on a boundary between the toner detecting portion and the holder attachment portion on the convex side of the toner detecting portion.

3. A toner-remaining-amount detection sensor according to claim 2, wherein the actuator comprises:
    an arm portion rockably supported by the holder member;
    a pressure detecting portion which approaches the toner detecting portion of the rubber member from a concave side;
    a light blocking plate for blocking or unblocking the light path of the light detecting portion of the transmission sensor; and
    a rib protruding beyond the opening rim from the arm portion in a radial direction of the opening of the holder member.

4. A toner-remaining-amount detection sensor according to claim 1, wherein the actuator moves by its own weight from the first position to the second position.

5. A toner-remaining-amount detection sensor according to claim 2, wherein the actuator moves by its own weight from the first position to the second position.

6. A toner-remaining-amount detection sensor according to claim 1, further comprising urging means for urging the actuator to the second position.

7. A toner-remaining-amount detection sensor according to claim 2, further comprising urging means for urging the actuator to the second position.

8. A toner storage container, comprising the toner-remaining-amount detection sensor according to claim 1.

* * * * *